United States Patent [19]

Whyte et al.

[11] 4,210,901

[45] Jul. 1, 1980

[54] SIGNAL REPEATER FOR A DISTRIBUTION NETWORK COMMUNICATION SYSTEM

[75] Inventors: Ian A. Whyte, Churchill Boro.; Leonard C. Vercellotti, Oakmont; James P. McGivern, Plum Borough, all of Pa.

[73] Assignee: Westinghouse Electric Corp., Pittsburgh, Pa.

[21] Appl. No.: 959,825

[22] Filed: Nov. 13, 1978

Related U.S. Application Data

[63] Continuation of Ser. No. 790,227, Apr. 25, 1977, abandoned.

[51] Int. Cl.² .............................................. H04B 3/54
[52] U.S. Cl. ................................ 340/310 R; 336/175; 455/78
[58] Field of Search ........ 340/310 R, 310 A, 310 CP; 325/21; 179/170 R, 170 J; 307/3, 149; 336/175

[56] References Cited

U.S. PATENT DOCUMENTS

| | | | |
|---|---|---|---|
| 3,448,383 | 6/1969 | Starzec et al. | 325/21 |
| 3,942,168 | 3/1976 | Whyte | 340/310 R |
| 3,967,264 | 6/1976 | Whyte et al. | 340/310 A |
| 3,973,087 | 8/1976 | Fong | 340/310 R |
| 4,016,429 | 4/1977 | Vercellotti et al. | 340/310 R |
| 4,032,911 | 6/1977 | Melvin | 340/310 A |
| 4,142,178 | 2/1979 | Whyte et al. | 340/310 R |

Primary Examiner—John W. Caldwell, Sr.
Assistant Examiner—James J. Groody
Attorney, Agent, or Firm—R. W. Smith

[57] ABSTRACT

A distribution network power line communication system divided into addressable communication zones defined by signal repeaters located at spaced intervals along the distribution network. The signal repeaters are switchably disposed in signal communication between the primary and grounded neutral conductors of the primary distribution network. Each repeater, when uniquely addressed by an interrogation signal from a central communication terminal, transfers the interrogation signal from the primary conductor to the primary grounded neutral conductor whereon it is transmitted to a uniquely addressed remote communication terminal coupled to a secondary neutral conductor within the communication zone of the signal repeater. A timely response signal from the remote communication terminal on the grounded neutral conductor is transferred by the repeater to the primary conductor and then to the central communication terminal. Coupling circuitry, responsive to repeater logic section control signals, connects the receiver and transmitter sections of each signal repeater to either the primary or grounded neutral conductors of the distribution network for signal amplification and bidirectional signal transmission.

14 Claims, 7 Drawing Figures

SIGNAL REPEATER FOR A DISTRIBUTION NETWORK COMMUNICATION SYSTEM

CROSS REFERENCE TO RELATED APPLICATIONS

This application is a continuation application of application Ser. No. 790,227, filed Apr. 25, 1977, now abandoned.

BACKGROUND OF THE INVENTION

1. Field of the Invention

This invention relates, in general, to power line carrier communication systems and, more specifically, to distribution network power line communication systems for performing distribution automation functions.

2. Description of the Prior Art

Considerable effort has been devoted in recent years to develop distribution network carrier communication systems due to the increased desirability of performing certain distribution automation functions, such as automatic reading of utility meters, selective load control, performing load continuity checks, and the like. However, using the distribution network as a communication link presents several problems not encountered in existing high voltage transmission line communication systems. The distribution line, along with the large number of distribution transformers attached thereto, presents poor high frequency impedance characteristics which rapidly attenuate the communication signals, as well as introducing electrical noise and signal interference.

U.S. Pat. Nos. 3,967,264, 3,942,168 and application Ser. No. 649,774, filed Jan. 16, 1976, now U.S. Pat. No. 4,016,429, all assigned to the assignee of the present application, disclose some form of communication system via the distribution network of an electrical utility. In application Ser. No. 649,774, now U.S. Pat. No. 4,016,429, there is disclosed a communication system which uses the grounded neutral conductor of the power system and the real or ground return path to transmit carrier communication signals between a central communication terminal and remote communication terminals located on the premises of the utility company customers. U.S. Pat. No. 3,967,264, meanwhile, utilizes the primary and secondary conductors of the power system to transmit the carrier communication signals. In an effort to reduce the attenuation and improve the transmission of the communication signals over the distribution network power conductors, these communication systems utilize signal repeaters which amplify the communication signal and improve its signal to noise ratio.

In the carrier communication system disclosed in U.S. Pat. No. 3,942,168, signal repeaters are disposed in signal communication with both the primary and secondary distribution network power line conductors at each distribution transformer site. In this system, the repeater, in addition to amplifying a signal, provides a bypass circuit for the interrogation and response signals around the associated distribution transformer which presents a significant attenuation at the frequencies of the communication signals, especially in the direction from the primary to secondary winding. The repeaters also include means for delaying a received signal, with the delay time interval selected such that the amplified signal is not applied to the power line at the same time the repeater is to receive another signal. This is implemented by means of a switch which connects either the receiver or the transmitter to the conductor. Each repeater includes two channels, each comprised of a receiver, logic and transmitter sections, for handling the bidirectional flow of interrogation and response signals between the central communication terminal and the remote communication terminals at the customer premises.

Similarly, signal repeaters are utilized at each distribution transformer in the communication system disclosed in U.S. Pat. No. 3,967,264 to provide a bypass circuit for the interrogation signals around the primary of the associated distribution transformer. Each repeater also includes two channels, each comprised of a receiver and transmitter section, to provide two-way communication signal transmission between the central communication terminal and the remote communication terminals. In addition, each repeater and remote communication terminal is uniquely addressable, thereby allowing the central communication terminal to communicate exclusively with a selected repeater and one of its associated remote communication terminals.

Although these types of distribution network communication systems are satisfactory in operation, the necessity of bypassing the primary of each distribution transformer results in the use of a large number of signal repeaters. Furthermore, each repeater must contain two separate channels to enable it to handle the bidirectional flow of interrogation and response signals.

Thus, it would be desirable to provide a distribution network communication system which has improved carrier communication signal transmission characteristics over prior art distribution network communication systems. It would also be desirable to provide an improved signal repeater which has extended range capabilities thereby allowing fewer repeaters to be used throughout the distribution network. Furthermore, a simplified repeater construction wherein one receiver and one transmitter are utilized to handle both the interrogation and response communication signals would also be desirable.

SUMMARY OF THE INVENTION

Herein disclosed is a distribution network power line communication system which includes a new and improved signal repeater. The distribution network includes a substation, primary distribution conductors extending between the substation and a plurality of distribution transformers and secondary conductors extending from each transformer to a plurality of electrical loads. A communication link is provided between a central communication terminal and remote communication terminals located at each electric load via the primary and grounded neutral conductors of the distribution network.

In operation, a central communication terminal receives a signal from a central control source point by conventional telephone or radio means and sends an interrogation signal to a specific remote communication terminal over the primary conductor of the distribution network. The interrogation signal contains the address of a specific signal repeater and a specific remote communication terminal within the communication zone of the selected signal repeater and further includes a code indicating which automation function is to be performed by the remote communication terminal.

The repeater uniquely addressed by the interrogation signal, transfers the signal to the grounded primary conductor of the distribution network which in turn is connected to the grounded secondary conductor on which is coupled the uniquely addressed remote communication terminal. The remote communication terminal, uniquely addressed, performs the desired automation function and transmits a response signal onto the neutral conductor containing data regarding the automation function.

The response signal is received by the associated signal repeater which then transfers the signal onto the primary conductor of the distribution network. The signal repeaters between the substation communication terminal and the remote communication terminal, which are not addressed by the interrogation or response signal, merely amplify and retransmit the response signal back onto the primary conductor for transmission to the next signal repeater.

To perform the dual functions of amplification and transferring the communication signals between the primary and neutral conductors of the distribution network, the novel signal repeater disclosed in this invention includes switches under the control of the logic circuitry of the repeater which connect the receiver and transmitter sections of the repeater to either the primary or neutral conductors of the distribution network in response to the type of communication signal and the address of a signal repeater contained therein. Initially, the switches connect the receiver of the signal repeater to the primary conductor in order to receive an interrogation signal. When a signal repeater receives a signal containing its unique address, the switches are disposed to connect the receiver and transmitter to the neutral conductor whereby the amplified signal is transmitted to the appropriate remote communication terminal and the response signal therefrom is again received by the signal repeater. Upon receiving a timely response signal, the switches are operably connected to the primary conductor to retransmit the signal back to the central communication terminal. When a signal is received by a non-uniquely addressed signal repeater, the switches remain connected to the primary conductor whereby the amplified signal is retransmitted back onto the primary conductor.

The use of such a switching arrangement enables a repeater to be utilized that contains only one receiver and transmitter channel instead of the two receiver and transmitter channels required in bidirectional repeaters utilized in prior art communication systems. This not only reduces the cost of each repeater, but also enables one type of repeater to be utilized throughout the distribution network. Furthermore, this coupling arrangement prevents unwanted signals and noise on the neutral conductor from being transmitted onto the primary conductor and thereby interfering with the communication signal.

BRIEF DESCRIPTION OF THE DRAWINGS

The various features, advantages and other uses of this invention will become more apparent by referring to the following detailed description and drawings, in which.

DESCRIPTION OF THE PREFERRED EMBODIMENTS

Figure 1:
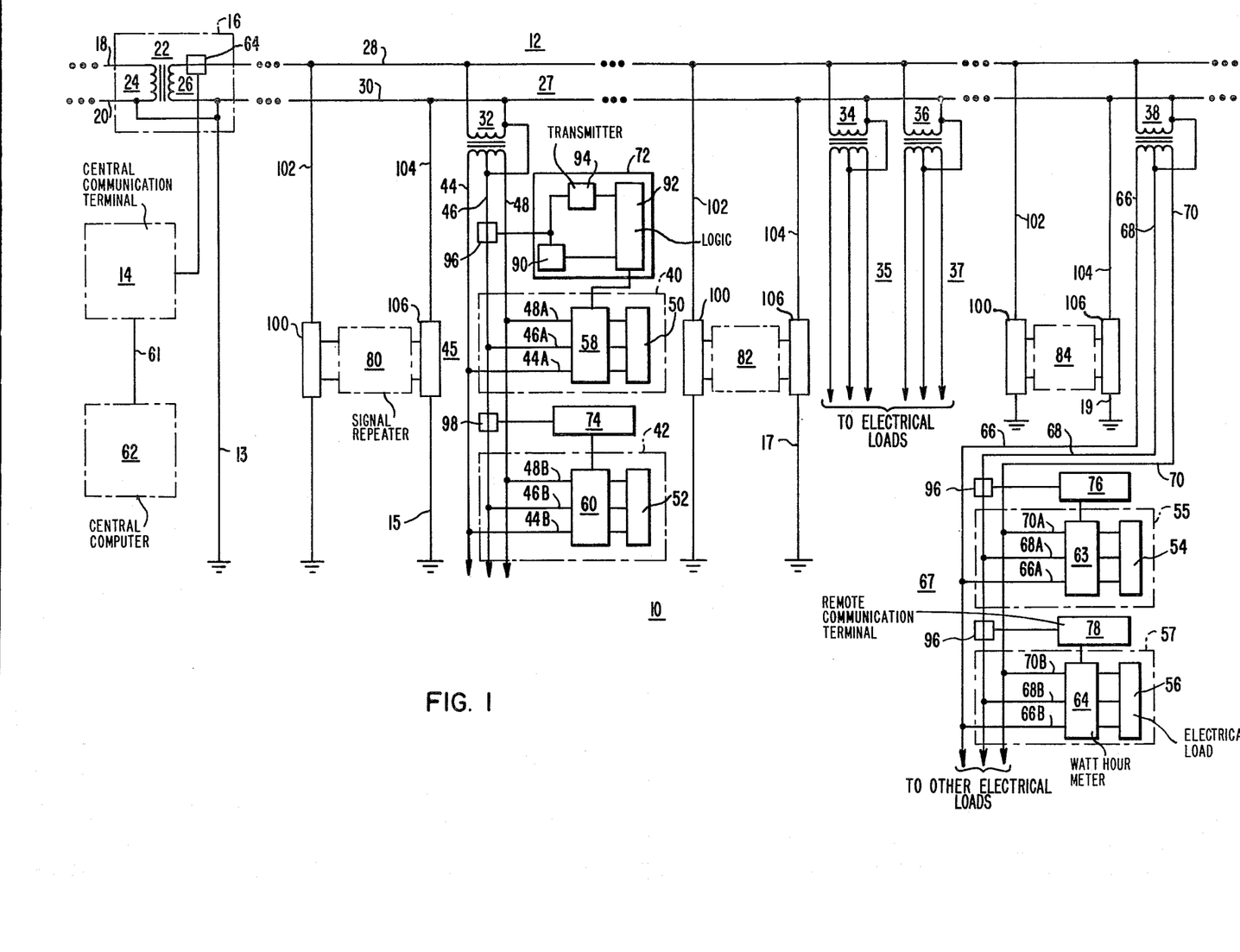
FIG. 1 is a block diagram of a distribution power line communication system constructed according to the teachings of this invention.

Referring now to the drawing, and to FIG. 1 in particular, there is shown a block diagram of a distribution network power line carrier communication system 10 constructed according to the teachings of this invention. The distribution network power line communication system 10 utilizes an electrical utility distribution network 12 to transmit high frequency communication signals between a central communication terminal, typically located at a distribution substation, and a plurality of remote communication terminals normally located at the electrical utility company customer premise. By way of introduction, the general arrangement of the distribution network 12 will be described for a better understanding of this invention.

By way of example and not of limitation, the distribution network 12 is provided by an electric utility company to distribute alternating electrical power, typically on the order of 60 Hz., from a substation 16 to electrical loads at multiple customer premises. For clarity, only one substation 16, one branch of primary distribution network conductors 27, and four branches of secondary distribution network conductors 35, 37, 45 and 67 are presented; it being understood that an actual distribution network could include several substations, many branches of primary distribution conductors, hundreds of secondary distribution conductors and several thousand remote customer loads. The substation 16 includes a high voltage step-down transformer 22, either wye or delta connected, which receives high voltage electrical power on its primary winding 24 from a generating site (not shown) through conductors 18 and 20. The secondary winding 26 of substation transformer 22 provides power at moderate voltage levels to the distribution network primary conductors 27 which link the substation 16 with a plurality of distribution transformers. The distribution network primary conductors 27 include at least first and second power line conductors 28 and 30, respectively, which form a single phase, two-wire system; it being understood that a three-phase, three-wire or a three-phase, four-wire distribution system may be utilized as well. According to standard electric utility company wiring practice, one of the distribution network primary conductors, such as conductor 30, is grounded at the substation 16 and also at multiple points along the primary distribution network 27 by ground line conductors carried on utility poles, such as ground line conductors 13, 15, 17 and 19. At various intervals along the primary distribution network 27, distribution transformers, such as transformers 32, 34, 36 and 38, are connected to the distribution network primary conductors 28 and 30 to transform the moderate voltage carried on the primary distribution conductors to the low voltage power used by the remote electrical loads. The secondary distribution network of each transformer, such as distribution networks 45 and 67, are similar, and as such only secondary distribution network 45 will be described in detail below. The secondary of each distribution transformer is connected to a secondary distribution network, such as secondary distribution network 45 associated with distribution transformer 32, which is typically comprised of two ungrounded conductors, such as conductors 44 and 48 of secondary distribution network 45, and one grounded conductor, such as conductor 46, which form a three-wire, single-phase secondary distribution network which delivers low voltage electrical power to a group of customer premises. Secondary service conductors 44A, 46A, 48A, and 44B, 46B, 48B conduct the low voltage power from the secondary distribution network conductors 44, 46 and 48 respectively, to each customer premise, such as customer premises 40 and 42. The grounded secondary distribution network conductor, such as conductor 46 of distribution network 45, is connected to the grounded neutral conductor of the primary distribution network, such as grounded primary conductor 30, to form a continuous, pole-to-pole, grounded neutral conductor throughout the distribution network 12.

The carrier communication system associated with the above-described distribution network 12 will now be described in detail. The carrier communication system shown in the preferred embodiment of this invention is generally comprised of a central communication terminal 14 typically located near substation 16, a central computer source 62 which could be located at the main business office of the electrical utility company, remote communication terminals, such as terminals 72, 74, 76 and 78, typically associated with remote electrical loads 50, 52, 54 and 56 located at utility company customer premises 40, 42, 55 and 57, respectively, and signal repeaters 80, 82 and 84 located at spaced intervals along the distribution network 12. The communication system, excluding the signal repeater, may be of the general type disclosed in U.S. Pat. No. 3,942,168 issued to I. Whyte, and assigned to the assignee of the present application. In accordance with the aforementioned patent, the central computer 62 may be programmed, for example, to interrogate certain remote communication terminals associated with loads connected to the distribution network and obtain data relative to the reading of utility meters or it may request the performance of other functions such as controlling electrically operated hot water heaters.

The interrogation signals prepared by the computer 62 are sent by any conventional means 61, such as radio or telephone lines, to a selected central communication terminal typically associated with a particular distribution substation, such as central communication terminal 14 associated with distribution substation 16. Central communication terminal 14 is disposed in signal communication with the primary distribution conductor 28 by a signal coupler 64 and is operative to generate interrogation signals and receive response signals.

In actual practice, the distance between the central communication terminal 14 and the remote communication terminals can be considerable. It is known that distribution network conductors, such as conductors 28 and 30, possess poor high frequency impedance characteristics and high electrical noise susceptibility; which factors greatly attenuate the high frequency carrier communication signals traveling thereon. To insure that the carrier communication signal generated at the central communication terminal 14 is received at the selected remote communication terminal in a usable form, signal repeaters, such as repeaters 80, 82 and 84, are disposed at spaced intervals along the distribution network 12. The signal repeaters 80, 82 and 84 recondition and amplify the carrier communication signal such that it is sufficient to reach either the adjacent signal repeater or the selected remote communication terminal. The signal repeaters also serve to bypass the distribution transformers connected to the primary distribution network 12 which eliminates the primary source of high frequency signal attenuation present in a distribution network communication system.

However, in order to bypass each distribution transformer in the distribution network prior art signal repeaters were required at each distribution transformer location to prevent undue signal attenuation. This resulted in the use of a prohibitive number of signal repeaters throughout a large distribution network. In order to reduce the number of signal repeaters required throughout the distribution network and at the same time prevent communication signal attenuation, signal repeaters, according to the preferred embodiment of this invention, are disposed in signal communication between the primary distribution conductor 28 and the primary distribution conductor 30 which is at ground potential as described above. Since the grounded neutral conductor 30 forms a continuous conductor throughout the distribution network 12 from the substation 16 to each electrical load, a single signal repeater can communicate with the large number of remote communication terminals associated with several distribution transformers. For example, signal repeater 82 can communicate with the remote communication terminals associated with the secondary distribution network distribution transformers 34 and 36. For clarity purposes only two distribution transformers 34 and 36 are shown in association with signal repeater 82; it being understood that a much larger number of distribution transformers can be serviced by signal repeater 82 according to the preferred embodiment of this invention.

As described in U.S. Pat. No. 3,942,168, each signal repeater and remote communication terminal contains a unique address which enables the central communication terminal 14 to select and communicate with a particular signal repeater and remote communication terminal. The signal repeaters, in such a communication system, divide the communication system into addressable zones, wherein each signal repeater is exclusively associated with certain remote communication terminals. For example, signal repeater 80 is associated with remote communication terminals 72 and 74 and signal repeater 84 is associated remote communication terminals 76 and 78.

Communication signals generated by the central communication terminal 14 are of the frequency-shift-key modulated type in which two frequencies represent binary states of logic which corresponds to information signals handled in the logic circuit of each remote terminal. An interrogation signal generated by the central communication terminal 14 would include a plurality of bits which identify the start of an interrogation signal, a plurality of bits which identify specific functions to be performed by the remote communication terminal, a plurality of bits which set forth the unique address of a selected signal repeater and also the unique address of a selected remote communication terminal within the zone of the uniquely addressed signal repeater.

According to the aforementioned patent, each remote communication terminal includes a receiver, logic circuitry and transmitter which are disposed in signal communication with the grounded conductor of a secondary distribution network via a signal coupler. Since each remote communication terminal is similarly constructed, only remote communication terminal 72 will be described in detail hereafter. Accordingly, remote communication terminal 72 includes receiver 90, logic circuitry 92 and transmitter 94 which are coupled via signal coupler 96 to the grounded neutral conductor 46 of secondary distribution network 45. Furthermore, the logic circuitry 92 communicates with certain automation equipment at customer premise 40, such as watthour meter 58. Signal coupler 96, typically, consists of a hollow core of magnetic material disposed in inductive relationship around the grounded secondary conductor 46 in a single turn primary winding transformer configuration with additional conductors inductively coupled to the core to form secondary connections which connect to the receiver and transmitter, 90 and 94, respectively, of remote communication terminal 72. Such a signal coupler is described in greater detail in co-pending application Ser. No. 790,228, filed Apr. 25, 1977, in the name of Whyte and Swanson, now U.S. Pat. No. 4,142,178, which is incorporated herein by reference.

In actual operation, an interrogation signal generated by central communication terminal 14 requesting a desired automation function to be performed by a remote communication terminal, such as terminal 72, for example, will contain the unique address of remote communication terminal 72 and its associated signal repeater 80. The interrogation signal generated by the central communication terminal 14 will be coupled by a signal coupler 64 onto the primary distribution network conductor 28 and be transmitted to signal repeater 80. Signal coupler 100, to be described below, will communicate the interrogation signal through ground line conductor 102 to repeater 80 whereon it would be received, amplified and retransmitted onto ground line conductor 104 through signal coupler 106. Ground conductor 104, in turn, is connected to the grounded primary conductor 30 which is connected to the grounded secondary conductor 46 of the secondary distribution network 45 associated with distribution transformer 32. The retransmitted interrogation signal carried on grounded secondary conductor 46 will be communicated by signal coupler 96 to the receiver section 90 of the remote communication terminal 72, whereon the signal will be decoded, the desired automation function will be performed and a response signal generated under the control of logic circuitry 92 containing the appropriate data regarding the automation function. The response signal generated by remote communication terminal 72 will be transmitted by transmitter section 94 via signal coupler 96 onto the grounded secondary conductor 46 and thence onto the primary conductor 30. The response signal, thus generated, is again received, amplified and retransmitted by signal repeater 80 onto the primary distribution conductor 28 for transmission to the central communication terminal 14 and onto the central computer 62 thereby completing the communication cycle.

Figure 2:
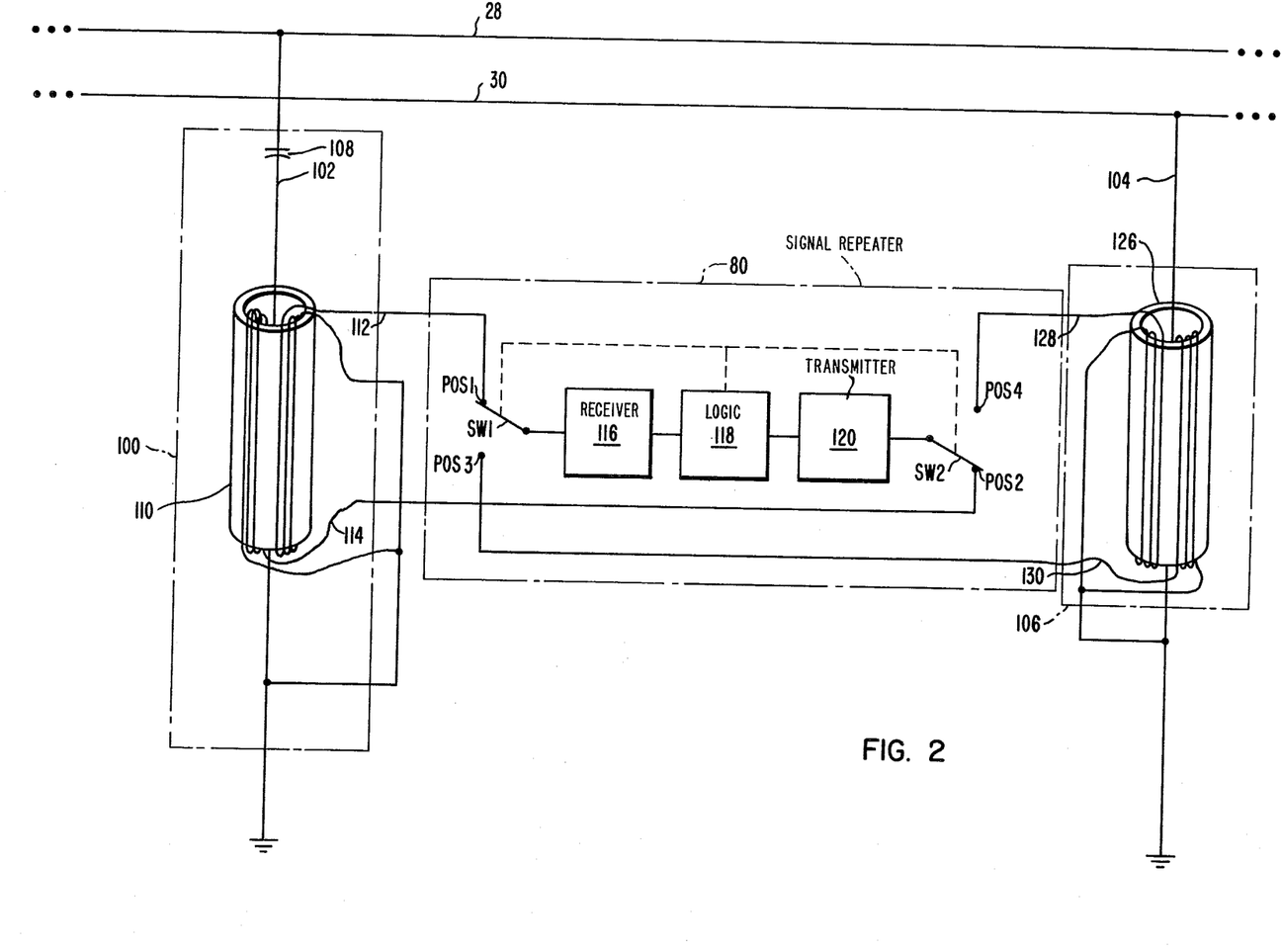
FIG. 2 is a block schematic view of a signal repeater constructed according to the teachings of this invention.

FIG. 2 depicts in schematic and block diagram form, a novel signal repeater constructed according to the teachings of this invention which will perform the above-defined task. Signal repeater 80, according to the preferred embodiment of this invention, is a time delay type signal repeater wherein the repeater receives a complete communication signal word before retransmitting any part of it. Also within the scope of this invention are time delay repeaters which operate bit-by-bit, that is, repeaters which receive and send a bit before receiving the next bit of the communication signal word. As shown in FIG. 2, signal repeater 80 is disposed in signal communication between the primary distribution conductor 28 and the grounded primary distribution conductor 30 via signal couplers 100 and 106, respectively. According to the preferred embodiment of this invention, signal coupler 100 includes a high voltage coupling capacitor 108 which communicates the high frequency communication signal between the primary distribution conductor 28 and the ground conductor 102 which is typically carried on an upright support or utility pole. A hollow core 110 of ferritic magnetic material is inductively coupled around ground line conductor 102 to form a single turn transformer primary winding. Additional wound conductors 112 and 114 are inductively coupled to core 110 to form secondary windings which provide coupling and impedance matching for the receiver 116 and transmitter 120 sections of signal repeater 80. Signal coupler 100 could also be of the type which utilizes a ground conductor connected to the grounded primary conductor 30. In that case, additional cores must be coupled around conductor 30 to block the communication signal from being diverted to adjacent ground conductors via the grounded conductor 30.

Signal coupler 106, on the other hand, is identical to signal coupler 100 except for the high voltage coupling capacitor 108 and includes a hollow core 126 inductively surrounding ground conductor 104 and secondary windings 128 and 130 inductively coupled to the hollow core 126 which also provide coupling and impedance matching for the receiver 116 and transmitter 120 sections of signal repeater 80. Switch means SW1 and SW2, which can include either single pole, double throw relay contacts or standard solid-state devices, are connected to the receiver 116 and transmitter 120, respectively, and thereby switchably connect receiver 116 and the transmitter 120 to signal couplers 100 and 106 under the control of the logic section 118 of signal repeater 80, which will be discussed in greater detail hereafter.

When observing the complete communication system from an interrogation and response signal view point with regard to remote communication terminal 72, as shown in FIGS. 1 and 2, the interrogation communication link includes the central computer source 62 which transmits interrogation signals via communication link 61 to the central communication terminal 14, signal coupler 64 which communicates the interrogation signal between the central communication terminal 14 and the primary distribution network conductor 28, a signal coupler-repeater-signal coupler combination wherein signal coupler 100 communicates the interrogation signal between the primary distribution conductor 28 and a ground line conductor 102, SW1 which connects signal coupler 100 and signal repeater 80, signal repeater 80 which delays and amplifies the interrogation signal, SW2 which links repeater 80 to signal coupler 106, signal coupler 106 which communicates the interrogation signal between ground line conductor 104 and the grounded distribution network conductor 30, the grounded neutral secondary conductor 46 of secondary distribution network 45 associated with distribution transformer 32 and remote communication terminal 72 coupled to secondary conductor 46 by signal coupler 96.

The response signal communication link includes remote communication terminal 72, signal coupler 96, the grounded neutral secondary conductor 46, the grounded primary distribution conductor 30, signal coupler 106 which communicates the response signal between the primary distribution conductor 30 and ground line conductor 104, SW1 coupling signal coupler 106 to repeater 80, signal repeater 80 which amplifies and delays the response signal from the remote communication terminal 72, SW2 which connects repeater 80 to signal coupler 100, signal coupler 100 which communicates the amplified response signal between ground line conductor 102 and the primary distribution conductor 28, signal coupler 64 which communicates the response signal between primary distribution conductor 28 and the central communication terminal 14 and communication link 61 which links the central communication terminal 14 with the central computer 62.

Since signal repeaters 80, 82 and 84 are similarly constructed, only signal repeater 80 will be described in detail below; it being understood that signal repeaters 82 and 84 contain identical circuitry. Specifically, FIG. 2 illustrates in block form a signal repeater constructed according to the teachings of this invention. As described above, signal repeater 80 is switchably disposed between the secondary of magnetic cores 110 and 126 of signal couplers 100 and 106, respectively, by switch means SW1 and SW2 which are controlled by logic section 118 of signal repeater 80. An interrogation or response communication signal is coupled by SW1 to receiver 116 which demodulates the communication signal. Receiver 116 can be any standard receiver adapted for demodulating high frequency communication signals such as one shown in greater detail in U.S. Pat. No. 3,911,415. Similarly, transmitter 120, which can be any standard transmitter, such as one shown in U.S. Pat. No. 3,911,415, amplifies and modulates the interrogation or response signals and retransmits the signal through SW2 to the appropriate signal coupler 100 or 106.

Figure 3:
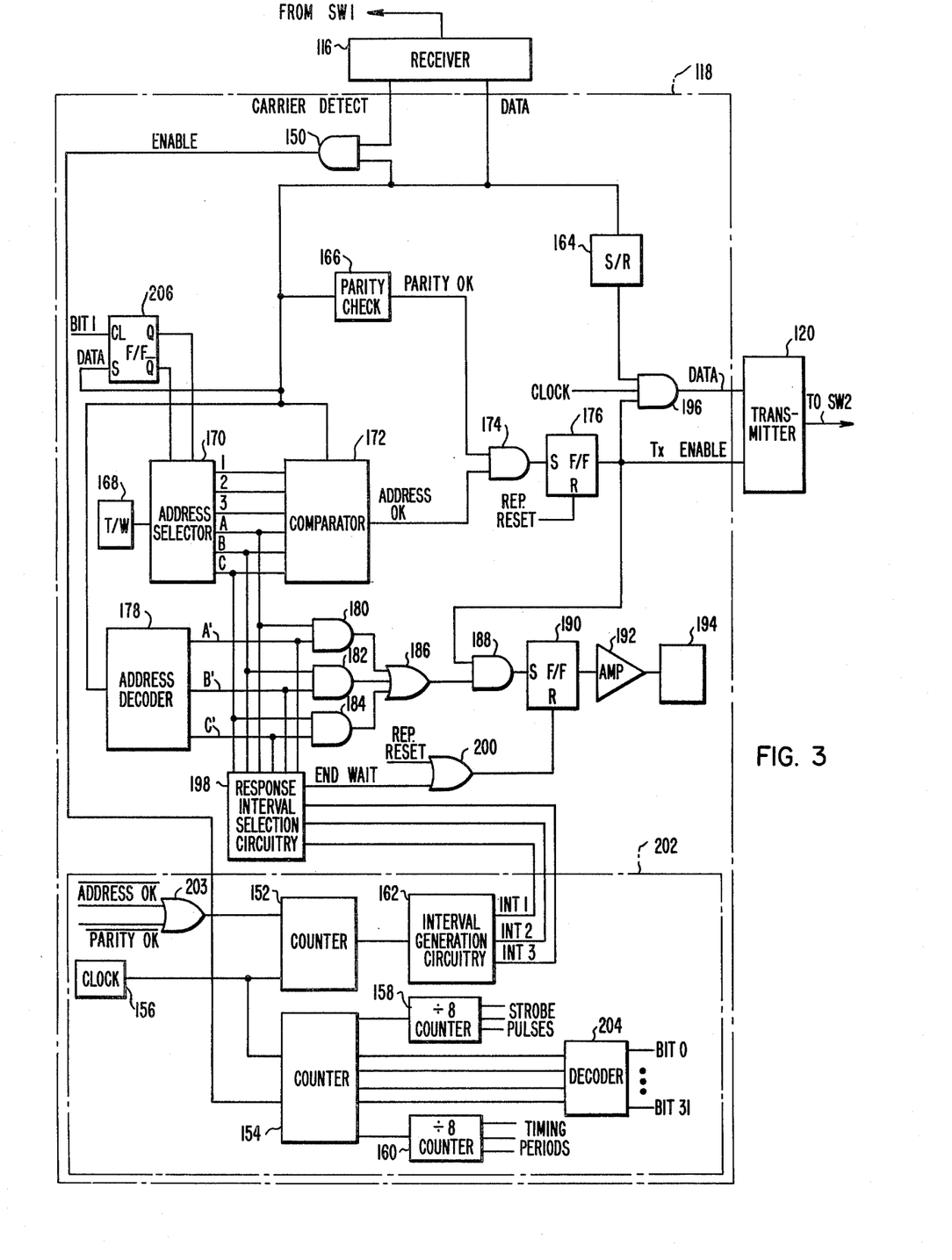
FIG. 3 is a block and schematic diagram of the receiver, transmitter and logic circuitry sections of the signal repeater shown in FIG. 2.

The means for operating switch means SW1 and SW2 can be more easily understood by referring to logic section 118 of signal repeater 80 as shown in greater detail in FIG. 3. In particular, receiver 116 inputs to logic section 118 the demodulated data contained in an interrogation or response communication signal along with a carrier detect signal which indicates the presence of a communication signal at signal repeater 80. The carrier detect and data signals are AND'ed together in AND gate 150, the output of which produces an ENABLE signal which energizes timing circuit 202. Timing circuit 202 includes counter 154 which, when energized by the ENABLE signal, counts the pulses from a clock circuit 156 and in conjunction with divide-by-eight counters 158 and 160 provides the appropriate strobe pulses and timing periods required by signal repeater 80. Since this type of timing circuit is well known to those skilled in the art, the specific use of each strobe pulse and timing period will not be described in detail except to note where an appropriate timing period is required throughout the logic circuitry. Timing circuit 202 also includes counter 152 and interval generation gating circuit 162 which provide three interval time periods referred to as INT1, INT2, and INT3, the use of which will be described in detail hereafter. In addition, the outputs of counter 154 are fed into a decoder 204 which generates signals indicative of the particular bit in the data message presently being processed by logic section 118 of repeater 80.

The data outputted by receiver 116 consists of a specific number of binary logic signals. In the preferred embodiment of this invention, this data is in the form of thirty-two bits of binary logic; although a different number of bits could also be utilized. As mentioned previously, this thirty-two bit data word contains the address of a specific signal repeater, the address of specific remote communication terminal associated with the specified repeater, the coded function to be performed by the remote communication terminal along with various control bits indicating, among other things whether the message is an interrogation or response signal.

To be uniquely addressable by the central communication terminal 14, each repeater must contain a distinct address. Furthermore, since a typical distribution network could contain several substations as well as many separate primary feeder lines each containing a plurality of signal repeaters, each signal repeater must contain a separate distinct address which identifies it both as to each primary feeder line and its position in that feeder line. Thus, according to the preferred embodiment of this invention, signal repeater 80, as shown in FIG. 1, could contain address A1 while signal repeater 82 would be identified by address B1 and signal repeater 84 identified by unique address C1. If another central communication terminal were connected adjacent signal repeater 84, each repeater must contain additional address associated with the second central terminal such as A2 for repeater 84, B2 for repeater 82 and C2 for repeater 80. The unique address for each signal repeater is programmed in the logic section of each signal repeater by a series of thumbwheel switches, such as switches 168 for signal repeater 80, as shown in FIG. 3. Thus, according to the example above, signal repeater 80 would contain an address A1 programmed in the thumbwheel switch 168 in logic section 118 thereby uniquely identifying it with respect to central communication terminal 14. In a distribution network having multiple central communication terminals, separate addresses for each repeater must be programmed into additional thumbwheel switches in order to uniquely identify each repeater with respect to each central terminal. The outputs from each thumbwheel in repeater 80 are fed into a repeater address selector circuit 170 which consists of an AND/OR selector circuit such as Motorola's MC14519B. Which thumbwheel input is selected by the address selector 170 is governed by flip-flop 206 which is set by bit 1 of the data message which contains the code of the central terminal which sent the message. The repeater address selector 170 generates an appropriate binary code indicative of the address of the repeater. This code, contained on output lines 1,2,3,A,B and C of repeater address selector 170, is compared with the appropriate bits of the communication signal, such as bits 17 through 22, for example, which contain the address of the repeater to be uniquely addressed by the central communication terminal, in comparator 172.

The address format utilized in the preferred embodiment of this invention is based on two concepts. First, the interrogation signal will contain an address uniquely identifying a particular signal repeater. In addition, each repeater must be able to recognize an interrogation signal from multiple sources and further, must be able to properly respond to an interrogation signal intended for another signal repeater in order to retransmit the signal onto the primary conductor of the distribution network. Thus, the interrogation signals utilized in the preferred embodiment of this invention contain a 6 bit code in bits 17 through 22 of each data word; bits 17 and 18 being associated with repeater "A", bits 19 and 20 with repeater B and bits 21 and 22 with repeater C. Furthermore, bits 17, 19 and 21 are used by one central terminal such as terminal 14, while bits 18, 20 and 22 are utilized by another central terminal if required. Thus, an interrogation signal from the central terminal 14 to repeater 84, whose address is C1, will have bits 17, 19 and 21 set to a "1" logic level such that repeaters 80 and 82, whose addresses are A1 and B1 respectively, will properly respond to the interrogation signal and retransmit it to signal repeater 84.

Figure 4:
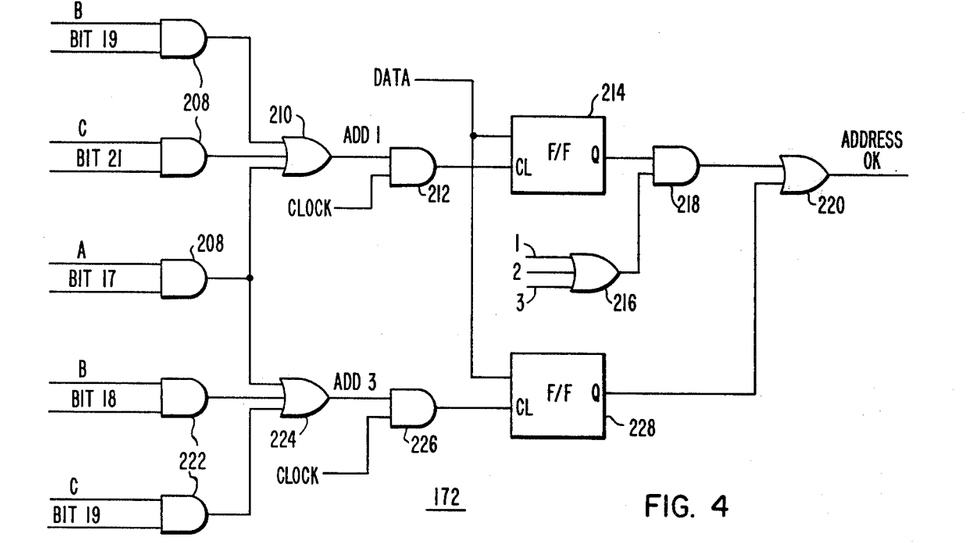
FIG. 4 is a detailed schematic diagram of the comparator circuitry shown in FIG. 3.

The comparator circuitry 172 necessary to decode the address is shown in greater detail in FIG. 4. The thumbwheel address outputs, A, B or C, from address selector 170 are fed into AND gates 208 along with the appropriate bit signal from decoder 206. Bits 17, 19 and 21 are used herein since the interrogation signal is generated by central communication terminal 14. The outputs of AND gates 208 are OR'ed by OR gate 210, whose output, labeled ADD1, is fed into AND gate 212. If, for example, repeater 80 whose address is A1, receives an interrogation signal, ADD1 will be a "1" since both the A signal from the thumbwheel and the bit 17 signal are at a "1" logic level. The ADD1 signal is AND'ed in AND gate 212 with a clock signal generated at the proper time during the processing of the data message. The output of AND gate 212, when high, enables flip-flop 214 which is set to the state of the data bit, bit 17 in the above example, carried on the DATA line. The output state of flip-flop 214 is inputted to AND gate 218 along with the output of OR gate 216 which selects the numeral portion of the thumbwheel address. A high or "1" logic level output from gate 218 will, through OR gate 220, generate an ADDRESS OK signal which indicates that the interrogation signal is properly recognized by the signal repeater. If multiple central terminals are utilized, a circuit similar to that described above for decoding bits 18, 20 and 22 of the data word, would be required.

The comparator circuit used to compare response signals is similar and contains gates 222, 224, 226 and flip-flop 228 as shown in FIG. 4. It should be noted that only bits 17, 18 and 19 are used in the response signal since each signal repeater merely retransmits the signal onto the primary conductor which simplifies the address code.

Simultaneously with the address comparison, a parity check circuit 166 performs a complex error check on the bits contained in the data message to ensure that the message has been received in its proper form. If the selected parity convention is met, the parity check circuit 166, FIG. 3, will generate a PARITY OK signal which is AND'ed with the ADDRESS OK signal from comparator 172 in AND gate 174, the output of which sets flip-flop 176 and creates a TX ENABLE signal which energizes transmitter 120. When the TX ENABLE signal is generated, each bit of the data which has been stored in a shift register 164 is AND'ed in AND gate 196 with an appropriate clock signal and passed on to transmitter 120.

Figure 5:
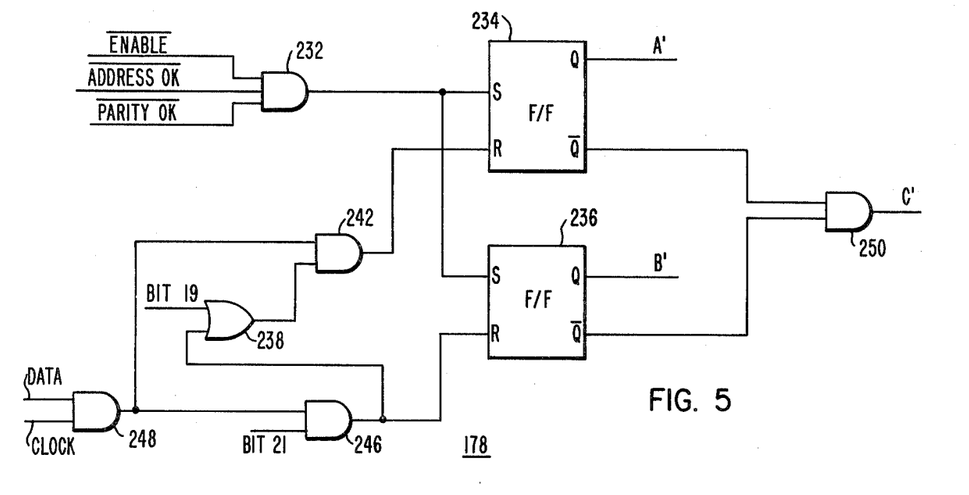
FIG. 5 is a detailed schematic diagram of the address decoder shown in FIG. 3.

Address decoder 178, meanwhile, decodes the address contained in the data message and generates outputs indicating which signal repeater along the distribution network is to be uniquely addressed. As shown in greater detail in FIG. 5, address decoder 178 includes AND gate 232 which has as its inputs the $\overline{\text{ENABLE}}$, $\overline{\text{ADDRESS OK}}$ and $\overline{\text{PARITY OK}}$ signals. When all of these signals are present, the output of AND gate 232 sets flip-flops 234 and 236 to the "1" state. At the same time, each bit of the data word is inputted into AND gate 248. The logic level of the address bits of the data word, namely bits 19 and 21, is checked in gates 238 and 246 by the bit pulses from decoder 204. Whenever control signal BIT19 is a "1", indicating that the logic state of bit 19 of the data word is present on the DATA line, the output of OR gate 238 will be a "1" also and the output of AND gate 242 will represent the logic state of bit 19 of the data word. As previously mentioned, bit 19 of the data word is associated with the address of the "B" repeater on a primary feeder line. A "1" in bit 19, therefore, indicates that the interrogation signal is not intended for repeater "A". Thus, the output of AND gate 242 will be at a "1" logic level which resets flip-flop 234 to the "0" state. Similarly, a "1" in bit 21 of the data word indicates that the interrogation signal is intended for the "C" repeater. In this instance, the output of AND gate 246 will also be a "1" which will reset flip-flop 236. The inverted outputs of flip-flops 234 and 236, each labeled $\overline{Q}$, are combined in AND gate 250, the output of which, when high, indicates that the C repeater is to receive the interrogation signa. In this manner, each signal repeater determines if the interrogation signal contains its unique address.

As shown in FIG. 3, the outputs of address decoder 178, labeled A', B', and C' are AND'ed with the appropriate A, B and C outputs of address selector 170 in AND gates 180, 182, and 184, respectively; the outputs of which are OR'ed in OR gate 186 which generates an output whenever the address contained in an interrogation signal matches the preprogrammed address of the signal repeater that has received the communication signal. The output of OR gate 186 is AND'ed with the TX ENABLE signal in AND gate 188. A "1" output from AND gate 188 will set flip-flop 190, the output of which is amplified through an amplifier 192 to the level required to energize switch control means 194. Upon energization of the switch control means 194, which includes a relay, switch means, SW1 and SW2, switch from positions 1 and 2 to positions 3 and 4, respectively, as shown in FIG. 2, thereby coupling the receiver and transmitter sections of the signal repeater to the ground line conductor and allowing the interrogation signal to be passed onto the ground line conductor 30 for transmission to the specified remote communication terminal associated with the specific repeater uniquely addressed by the interrogation signal. On the other hand, if OR gate 186 does not generate an output, indicating that the received data message contained an address of a signal repeater further along the distribution network, relay 194 will not be energized and switch means SW1 and SW2 will remain in positions 1 and 2 such that the communication signal will be transmitted through signal coupler 100 back onto primary distribution conductor 28 for transmission to the next signal repeater along the distribution network 12.

Figure 6:
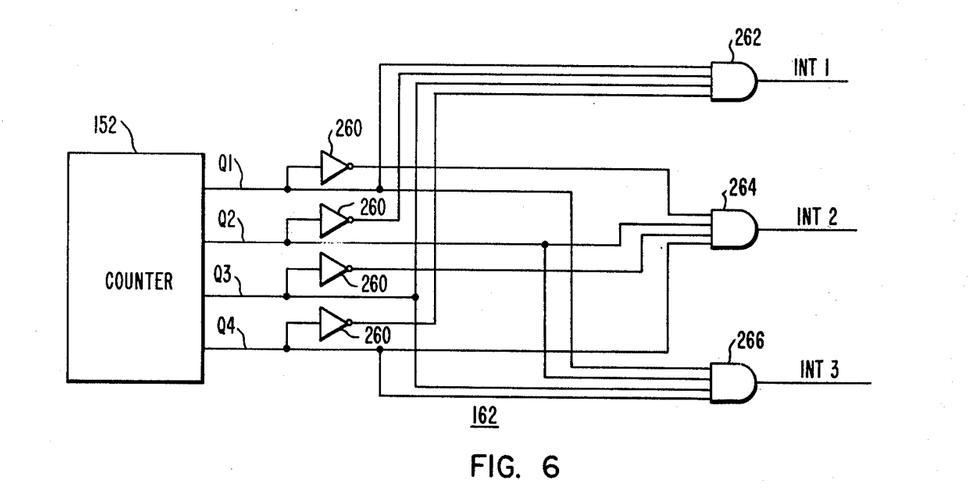
FIG. 6 is a detailed schematic diagram of the interval generation circuitry shown in FIG. 3.

As described previously, each signal repeater, upon retransmitting a communication signal, will wait a predetermined amount of time for a response signal. If a response is not received within the predetermined amount of time, the signal repeater will be reset and an appropriate error signal will be transmitted to the central communication terminal 14 indicating that a malfunction has occurred at the remote communication terminal or at a subsequent signal repeater. The predetermined amount of time that a particular signal repeater will wait for a correct response is determined by its position along the distribution network with respect to the central communication terminal 14. Thus, in the example described above wherein signal repeater 84 is to be uniquely addressed by the central communication terminal 14, signal repeater 80 after receiving and retransmitting the communication signal, must wait for the communication signal to be received and retransmitted by signal repeaters 82 and 84, a response to be generated by the uniquely addressed remote communication terminal associated with signal repeater 84, and the response signal received and again retransmitted by signal repeaters 84 and 82. Accordingly, in the same example, signal repeater 82 need only wait for the communication signal to be received by signal repeater 84, a response generated by the specified remote communication terminal associated with signal repeater 84, and the response signal again received and retransmitted by signal repeater 84. Since, in the preferred embodiment of this invention, three signal repeaters are attached to one primary feeder line of distribution network 12, only three distinct response intervals need be provided. The distinct timing intervals, labeled INT1, INT2 and INT3 are generated by counter 152 and interval generation circuitry 162 of timing circuit 202, as shown in FIG. 3. The interval generation circuitry 162 utilized to generate three distinct timing intervals is shown in greater detail in FIG. 6. As depicted therein, the outputs of counter 152 referred to as Q1, Q2, Q3 and Q4, are inverted by inverters 260 such that both states of each output are provided. Both the inverted and non-inverted state of the counter outputs are combined, as shown, in AND gates 262, 264 and 266 to generate timing intervals INT1, INT2 and INT3, respectively. The counter 152, which can be a common divide-by type of counter, generates outputs which are representative of a predetermined number of clock pulses from clock 156, shown in FIG. 3. Thus, for example, Q1 might be high every 0.5 second, Q2 every 1.0 second, Q3 every 2.0 seconds and Q4 every 4.0 seconds. When combined in the manner shown in FIG. 6, INT1 would be 2.5 seconds long, INT2 would be 5.0 seconds long and INT3 would be 7.5 seconds long. All three timing intervals begin when an interrogation signal is received by a signal repeater as indicated by the output of OR gate 203 in FIG. 3 which combines the $\overline{\text{ADD OK}}$ and $\overline{\text{PARITY OK}}$ signals.

The three response timing intervals along with the decoded programmed address of the signal repeater and the decoded repeater address contained in the data message are gated into the response interval selection circuitry 198 wherein the appropriate timing interval is matched with the respective position of the signal repeater along the distribution line and the unique address of the signal repeater contained in the data message to provide the proper response interval for a repeater. At the end of the selected interval, an END WAIT signal is generated by the interval selection circuitry 198 if the response signal is not received at a specific signal repeater within the predetermined time interval. The END WAIT signal will reset flip-flop 190, shown in FIG. 3, and thereby deenergize relay 194 which returns switch means SW1 and SW2 to positions 1 and 2, respectively, and resets the signal repeater for another communication signal. If the response signal is received by a specific signal repeater within the predetermined amount of time, a repeater reset signal, generated by appropriate clock pulses and shown OR'ed with the END WAIT signal in OR gate 200, will already have reset flip-flop 190 such that the END WAIT signal will have no affect on the operation of relay 194.

Figure 7:
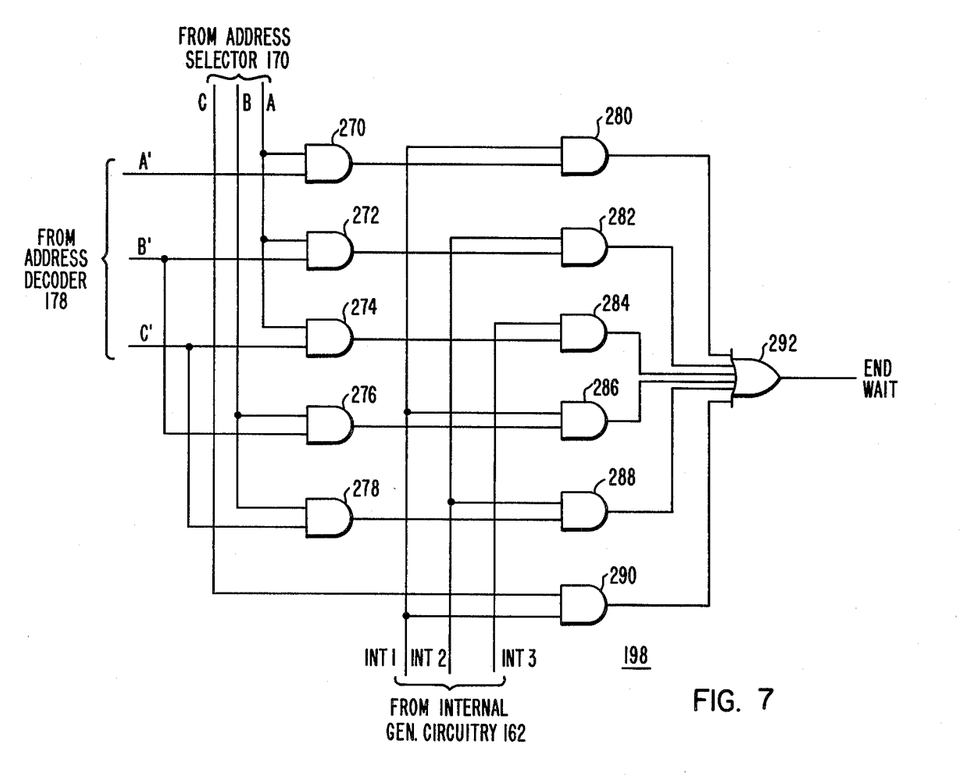
FIG. 7 is a detailed schematic diagram of the interval selection circuitry shown in FIG. 3.

The interval selection circuitry 198 is depicted in greater detail in FIG. 7. For clarity, only the circuitry utilized to generate the proper interval for a repeater whose programmed address is "A" will be described, it being understood that the circuitry necessary to generate an interval when the repeater address is "B" or "C" operates in an identical manner as shown by gates 276, 278, 286, 288 and 290 in FIG. 7. Thus, when a repeater address is programmed to be "A", the "A" output from address selector 170, shown inputted into AND gates 270, 272 and 274, will be high or at a "1" logic level. Concurrently, one of the outputs from the address decoder 178 will be a "1" indicating which signal repeater is to be uniquely addressed by the interrogation signal. The signals, A', B' and C' are inputted into AND gates 270, 272 and 274, respectively, such that the output of one of the AND gates 270, 272 and 274 will be high or a "1" whenever a repeater, whose address is "A" receives an interrogation signal.

The outputs of AND gates 270, 272 and 274 are combined with the appropriate time interval INT1, INT2 or INT3 in AND gates 280, 282 and 284, respectively. For example, the output of AND gate 270, indicating that a repeater whose address is "A" received signal containing an "A" repeater address, is combined with the INT1 signal which is the shortest interval, in AND gate 280 since the signal need only be transmitted to and from the specified remote terminal associated with repeater "A". If the interrogation signal contained the address of repeater "B" or "C" a longer interval would be selected for repeater "A" in gates 282 or 284 since the communication signals must be processed by additional repeaters before it is returned to repeater "A".

The interval signals, INT1, INT2 and INT3 will be a "1" at the end of their appropriate time periods which will thereby generate an output from one of the AND gates 280, 282 or 284 which is selected through OR gate 292 to generate the END WAIT signal.

The operation of the above-described signal repeater circuitry can be more easily understood by reference to FIG. 1 and to another example wherein the central communication terminal 14 generates an interrogation signal containing the address of signal repeater 84 and a remote communication terminal associated with signal repeater 84. Throughout the following example, it will be assumed that the message received at each signal repeater is correct; that is, the PARITY OK and ADDRESS OK signals are generated in each instance and furthermore that the response signal has been received within the predetermined amount of time specified for each signal repeater. Thus, the interrogation signal generated by central communication terminal 14 will be transmitted along the primary conductor 28 to signal repeater 80. Since the preprogrammed address of signal repeater 80 does not match the repeater address contained in the interrogation signal, switching relay 194 in repeater 80 will not be energized. At the appropriate point in the timing period, the interrogation signal will be retransmitted back onto primary distribution conductor 28 whereon it will be communicated along distribution conductor 28 to signal repeater 82. Switching relay 194 in signal repeater 82 will, likewise, not be energized since the address of signal repeater 82 does not match the address contained in the interrogation signal; whereon the interrogation signal is retransmitted by signal repeater 82 back onto the primary distribution conductor 28 for communication to signal repeater 84. Since the interrogation signal contains the unique address of signal repeater 84, the switching relay 194 contained in the logic section 118 of signal repeater 84 will be energized thereby moving SW1 and SW2 to positions 3 and 4, respectively, which connects the receiver and transmitter sections of signal repeater 84 to the ground line conductor 30 of the distribution network 12 and permitting the interrogation signal to be transferred along the primary grounded neutral conductor 30 and the secondary neutral conductor 68 to the uniquely addressed remote communication terminal associated with signal repeater 84, such as remote communication terminal 76 at customer premise 55. After the desired automation function contained in the interrogation signal is performed by the remote communication terminal 76, a response signal is generated and transmitted along secondary neutral conductor 68 and primary neutral conductor 30 to signal repeater 84. Upon receiving the response signal from the remote communication terminal 76, signal repeater 84 will generate a reset signal which will deenergize switching relay 194 and return switches SW1 and SW2 to positions 1 and 2, respectively, whereby the response signal will be retransmitted back onto the primary distribution conductor 28 for transmission to signal repeater 82. Signal repeater 82 will recognize the communication signal as being a response type signal and will amplify and retransmit the response signal back onto primary distribution conductor 28 to signal repeater 80 which will operate in a similar fashion and retransmit the response signal onto primary conductor 28 whereon it is carried to the central communication terminal 14.

Thus, it will be obvious to one skilled in the art that there has been disclosed a distribution network power line communication system utilizing a new and improved signal repeater. Each signal repeater, located at spaced intervals along the distribution network, communicates exclusively with certain remote communication terminals connected to the grounded neutral conductor of the secondary distribution networks associated with certain distribution transformers. A pair of switches, connected to the receiver and transmitter sections and controlled by the logic circuitry of the repeater, link each signal repeater to a hollow core type signal coupler disposed in signal communication with the primary distribution network conductor for receiving an interrogation signal. After decoding the interrogation signal, the switches change positions and connect the receiver and transmitter of the signal repeater to the grounded neutral conductor such that the interrogation signal will be transferred to the grounded distribution network conductor for transmission to the selected remote communication terminal. The switches operate in a reverse manner to transfer a response signal from the neutral conductor to the primary conductor for transmission to the central communication terminal.

The unique switching arrangement utilized in this invention eliminates the need for two separate channels, each containing a receiver and transmitter, as typically required for bidirectional signal transmission in prior art type signal repeaters.

Furthermore, the unique switching arrangement prevents unwanted signals and noise on the neutral conductor from interfering with communication signals carried on the primary distribution network conductor. Finally, by switchably connecting each signal repeater between the primary and neutral conductors of a distribution network, each repeater can communicate with a larger number of remote terminals than previously possible which reduces the number of signal repeaters required in a distribution network communication system.

What is claimed is:

1. A power line communication system, comprising:
   a uniquely addressable signal repeater;
   a uniquely addressable remote communication terminal;
   means for providing an interrogation signal which includes the address of said signal repeater and the address of said remote communication terminal;
   a first communication link including primary power line conductor means interconnecting said means for providing an interrogation signal and said signal repeater;
   a second communication link including branch secondary power line conductor means distributing electric power from said primary power line conductor means and interconnecting said signal repeater with said remote communication terminal;
   said remote communication terminal, when uniquely addressed by an interrogation signal over said second communication link, including means for providing a response signal on said second communication link;
   said signal repeater including a first signal coupler means, disposed in signal communication with said first communication link, for communicating signals between said first communication link and said signal repeater and a second signal coupler means, disposed in signal communication with said second communication link, for communicating signals between said signal repeater and said second communication link;
   said signal repeater including single means for receiving interrogation and response signals and also single means for transmitting interrogation and response signals;
   said signal repeater including means for switchably connecting said single receiving means to said first signal coupler means to receive interrogation signals carried on said first communication link and to said second signal coupler means to receive response signals carried on said second communication link and, also, for switchably connecting said signal transmitting means to said second signal coupler means to transmit said interrogation signals onto said second communication link and to said first signal coupler means to transmit said response signals onto said first communication link such that said interrogation and response signals are transferred between said first and second communication links according to a predetermined sequence; and
   means for receiving said response signal from said signal repeater on said first communication link.

2. The power line communication system of claim 1 wherein the first communication link includes a primary power line conductor at ground potential and the second communication link includes a secondary power line conductor at ground potential connected to the primary conductor at ground potential and wherein said second signal coupler means is disposed in signal communication with both of the primary and secondary power line conductors at ground potential adjacent a junction of said branch secondary power line conductor means and said primary power line conductor means.

3. The power line communication system of claim 1 wherein the means for switchably connecting the single receiving means and the single transmitting means of the signal repeater includes a first switch connected to said single receiving means and switchably disposed between the first and second signal coupler means and further includes a second switch connected to said single transmitting means and switchably disposed between said first and second signal coupler means.

4. The power line communication system of claim 3 wherein the signal repeater includes logic means for decoding selected bits of the interrogation and response signals and for generating, in response thereto, control signals for operably switching the first and second switches between the first and second signal coupling means such that said interrogation and response signals are transferred between said first and second communication links according to a predetermined sequence.

5. The power line communication system of claim 4 wherein the first signal coupler means includes a first conductor connected to earth ground and the second signal coupler means includes a second conductor connected to earth ground, said first signal coupler further including a first transformer element inductively coupled around said first conductor, said second signal coupler further including a second transformer element inductively coupled around said second conductor; each of said first and second transformers having primary and secondary portions, said primary portion consisting of a hollow core of magnetic material disposed in inductive relation around said ground conductor whereby a single turn primary winding is formed, said secondary portion including wound conductors inductively coupled to said core to form first and second coupling terminations for the signal repeater, said first signal coupler further including a capacitor element connecting said first communication link to said first ground conductor.

6. The power line communication system of claim 5 wherein the first switch is switchably disposed between the first coupling terminations of the first and second transformers and the second switch is switchably disposed between the second coupling terminations of said first and second transformers.

7. The power line communication system of claim 6 wherein the logic means further includes means for comparing the repeater address contained in an interrogation signal with the unique address of the signal repeater and for generating, in response thereto, a control signal indicating whenever said addresses match.

8. The power line communication system of claim 7 further including switch control means, responsive to the control signal from the comparator means, for controlling the position of the first and second switches.

9. The power line communication system of claim 8 wherein the logic means of the repeater includes means for energizing the switch control means for a predetermined amount of time, said predetermined amount of time being sufficient for the interrogation signal to be transmitted to the remote communication terminal specified in said interrogation signal and the response signal generated thereby, to be received by said signal repeater.

10. The power line communication system of claim 9 wherein the switch control means is an electromechanical relay and the first and second switches are contacts thereof.

11. A power line communication system comprising:
an electrical distribution network including primary conductors extending between a distribution substation and a plurality of distribution transformers, branch secondary conductors extending between said distribution transformers and certain electrical loads, with one of said primary and one of said secondary conductors disposed at ground potential with respect to the others of said primary and secondary conductors to form a continuous ground conductor extending between said distribution substation and each electrical load;

uniquely addressable remote communication terminals associated with certain of said electrical loads; said remote communication terminals disposed in signal communication with said ground conductor of said distribution network;

means, disposed in signal communication with one of said primary conductors of said distribution network for generating interrogation signals containing at least the address of a repeater and remote communication terminal;

each of said remote communication terminals, upon receiving an interrogation signal, providing a response signal on said ground conductor;

uniquely addressable signal repeaters associated with certain of said remote communication terminals, each of said signal repeaters including single means for receiving and single means for transmitting interrogation and response signals, each of said signal repeaters further including first and second signal couplers, said first signal coupler including a coupling capacitor and a first conductor connected to earth ground, said coupling capacitor coupling one of said other primary conductors in signal communication with said first ground conductor, said second signal coupler including a second conductor connected to earth ground and to one of said conductors at ground potential adjacent one of said distribution transformers, first and second transformer elements associated with said first and second ground conductors, respectively, each of said first and second transformers having primary and secondary portions; said primary portion consisting of a hollow core of magnetic material disposed in inductive relation around one of said first or second ground conductors whereby a single turn primary winding is formed; said secondary portion including two wound conductors inductively coupled to said core to form first and second coupling terminations;

each of said signal repeaters including at least first and second switches, said first switch being connected to said single receiving means and said second switch being connected to said single transmitting means;

said first switch switchably disposed between said first coupling terminations of said first and second transformers, said second switch switchably disposed between said second coupling terminations of said first and second transformers;

each of said signal repeaters including switch control means for operably moving said first and second switches between said coupling terminations of said first and second transformer elements; and each of said signal repeaters further including logic means for decoding selected bits of said interrogation and response signals and for generating, in response thereto, control signals useful in operating said switch control means, said logic means including means for comparing the address of said signal repeater with the repeater address contained in said interrogation and response signals and for generating in response thereto, a control signal whenever said addresses match;

said switch control means being responsive to said control signal from said comparing means and having a first state wherein said first and second switches are connected to said first and second coupling terminations of said first transformer element, respectively, and a second state wherein said first and second switches are connected to said first and second coupling terminations of said second transformer element, respectively.

12. The power line communication system of claim 1 including further ones of said uniquely addressable signal repeater so as to include a plurality of the signal repeaters; and wherein the means for switchably connecting the single receiving means and single transmitting means in each of said signal repeaters is operative to connect said single receiving means to the first signal coupler means to receive response signals on the first communication link from another one of said signal repeaters and, also, to connect said single transmitting means to said first signal coupler means to transmit interrogation signals onto said first communication link to another one of said signal repeaters.

13. The power line communication system of claim 11 wherein the logic means of each repeater includes means for holding the switch control means in the second state for a predetermined amount of time, said predetermined amount of time being sufficient for the interrogation signal to be transmitted to the remote communication terminal specified in the interrogation signal and the response signal, generated thereby, to be received by said signal repeater.

14. The power line communication system of claim 13 wherein the switch control means is an electrical relay and the first and second switches are relay contacts associated with said relay.

* * * * *